United States Patent Office 3,646,064
Patented Feb. 29, 1972

3,646,064
4-IMINO - 19 - NOR-A-HOMO-STEROID-TRIENES AND A PROCESS FOR THEIR MANUFACTURE
Georg Anner, Basel, and Peter Wieland, Oberwil, Basel-land, Switzerland, assignors to Ciba Corporation, Summit, N.J.
No Drawing. Filed Dec. 3, 1968, Ser. No. 780,875
Claims priority, application Switzerland, Dec. 6, 1967, 17,109/67
Int. Cl. C07d 13/04
U.S. Cl. 260—340.9     11 Claims

ABSTRACT OF THE DISCLOSURE

Steroid compounds of the partial formula

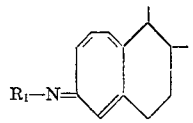

wherein $R_1$=free or esterified hydroxyl or a substituted amino group, especially those of the androstane, pregnane or cholestane series are prepared by reacting a compound of the partial formula

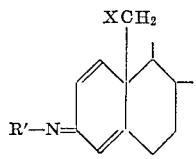

wherein X is a hydroxyl group esterified with a strong inorganic or organic acid, with a strong inorganic or organic base. Use: Intermediates for the manufacture of the known, pharmacologically active 4-oxo-19-nor-A-homo-steroid-2,4a,10(1)-trienes.

---

The present invention provides new 4-imino-19-nor-A-homosteroidtrienes whose double bonds are located in the ring A, preferably such as belong to the androstane, pregnane or cholestane series, especially 4-imino-19-nor-A-homoandrosta-$\Delta^{2,4a,10(1)}$-trienes, in the first place those of the general formula (I)

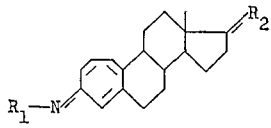

in which $R_1$ represents a free or esterified hydroxyl group or a substituted, especially acylated, amino group and $R_2$ a free or ketalized oxo group or a β-positioned free, esterified or etherified hydroxyl group together with a hydrogen atom or with an unsaturated or saturated lower aliphatic hydrocarbon residue, or 4-imino-19-nor-A-homo-pregna-$\Delta^{2,4a,10(1)}$-trienes, primarily those of the formula (II)

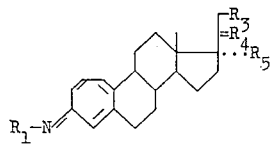

in which $R_1$ has the meaning given above, $R_3$ stands for hydrogen or a free, esterified or etherified hydroxyl group, $R_4$ for a free or ketalized oxo group, especially the ethylene dioxy group, and $R_5$ for hydrogen or a free or esterified hydroxyl group, or $R_3$, $R_4$ and $R_5$ together represent a bis-methylenedioxy group, or 4-imino-19-nor-A-homo-cho-lesta-$\Delta^{2,4a,10(1)}$-triene, as well as a process for their manufacture.

A substituted amino group is, for example, an amino group containing one or two aliphatic, araliphatic or aromatic residues as substituents, for example a mono- or di-alkylamino, an alkyleneamino such as a piperidino or pyrrolidino group, a phenylamino or benzylamino group, or an amino group substituted by an acyl residue, such as the residue of an aliphatic, araliphatic or aromatic carboxylic acid, especially by the residue of a carbamic or thiocarbamic acid.

An esterified hydroxyl group is more especially a hydroxyl group esterified with an aliphatic, alicyclic, araliphatic or aromatic carboxylic acid containing up to 20 carbon atoms, for example with formic, methylcarbonic, acetic, trifluoro-acetic, trimethylacetic, propionic, caproic, decanoic, undecylenic, hexahydrobenzoic, cyclopentyl-propionic, phenylpropionic, benzoic, or furancarboxylic acid. An etherified hydroxyl group is more especially a hydroxyl group etherified with an aliphatic, cycloaliphatic, araliphatic or heterocyclic alcohol, for example with tetrahydrofuranyl or tetrahydropyranyl alcohols.

Suitable lower saturated or unsaturated aliphatic residues are, for example lower alkyls such as methyl, ethyl, propyl or isopropyl residues, lower alkenyl such as vinyl, allyl or methallyl residues, or lower alkinyl such as ethinyl or propinyl residues. The term "lower" as used above and hereinafter when referring to hydrocarbon residues designates those residues which contain up to 5 chain carbon atoms.

The new compounds are valuable intermediates for the manufacture of the known, pharmacologically highly potent 4-oxo-19-nor-A-homosteroid-2,4a,10(1)-trienes, for example by hydrolysis. They are pharmacologically also active themselves, for example, they are active against inflammation and tumors and/or lower the cholesterol level of the blood.

Particularly valuable are those compounds of the above formula in which $R_2$ represents an oxo group, or an esterified or preferably free hydroxyl group together with a hydrogen atom or with a methyl, ethyl or ethinyl group, and $R_1$ represents a free hydroxyl group or a ureido or thioureido residue.

The new 4-imino-A-homosteroid-trienes are obtained when a 3-imino-$\Delta^{1,4}$-steroid-diene that contains a reactive esterified hydroxylmethyl group in position 10, especially a diene of the partial formula

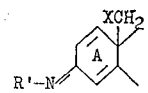

in which R' represents a free or esterified hydroxyl group or a secondary or tertiary amino group, X is a hydroxyl group esterified with a strong inorganic organic acid, such as a hydrohalic or sulphonic acid, for example hydrochloric, hydrobromic, p-toluenesulphonic or methanesulphonic acid is reacted with a strong base and, if desired, a ketalized oxo group present in a resulting compound is liberated and/or an esterified or etherified hydroxyl group is hydrolyzed and/or a 17-oxo group present is reduced, possibly with simultaneous introduction of a lower aliphatic, saturated or unsaturated hydrocarbon radical and/or a hydroxy group present in a resulting compound is esterified.

As strong base there may be used any desired strong inorganic base, such as an alkali metal hydroxide, for example sodium, potassium or lithium hydroxide, or an organic base such as an open-chain or cyclic tertiary or secondary amine, for example trimethylamine, triethyl-amine, pyridine, collidine or piperidine.

If desired, esterified or etherified hydroxyl groups or ketalized oxo groups present in resulting process products may be split hydrolytically. A free oxo group in position 17 can be reduced, for example, with a complex light-metal hydride, especially an alkali metal borohydride or lithium-aluminum hydride, to form the 17-hydroxy group. Alternatively, it may be reduced with a metal derivative, especially a Grignard compound or an alkali metal derivative, such as lithium or sodium derivative of a lower aliphatic compound, to form the $17\alpha$-substituted $17\beta$-hydroxy compounds. A free hydroxyl group may be esterified in the usual manner, especially with the acids mentioned, their anhydrides or halides, or with the alcohols mentioned.

The starting materials to be used in the present process are known or can be prepared by known methods, for example by reacting the corresponding 3-ketones with hydroxylamine or an ester thereof or with a substituted hydrazine. This reaction may be preformed in the presence of a strong base, during which the intermediately formed imine enters the reaction of this invention in the reaction medium.

Accordingly, the invention includes also any variant of the process in which a starting material is formed in situ or is used in the form of a salt or other derivatives thereof, or in which an intermediate obtained at any stage of the process is used as starting material and any remaining step/steps is/are carried out.

The following examples illustrate the invention without restricting it in any sense.

EXAMPLE 1

A mixture of 10 g. of 3-oxo-17-ethylenedioxy-19-mesyloxy-$1,4$-androstadiene, 10 g. of hydroxylamine hydrochloride and 1 liter of pyridine is stirred for 22 hours at 30° C., then poured into 6 liters of water, extracted with toluene, washed with water, dried and evaporated under vacuum. The resulting crude 3-oximino-17-ethylenedioxy-19-mesyloxy-$1,4$-androstadiene is dissolved in ½ liter of 8% methanolic sodium hydroxide solution and the whole is then refluxed for 2 hours under nitrogen. The deep-red reaction solution is then poured into 2 liters of water and and 66 ml. of glacial acetic acid, then repeatedly extracted with a 1:4-mixture of methylenechloride+ether, washed with dilute sodium bicarbonate solution, dried and evaporated under vacuum. Crystallization from ether furnishes 3.71 g. of 4-oximino-17-ethylenedioxy-A-homo-$\Delta^{1(10),2,4a}$-19-norandrostatriene in the form of deep-red crystals which after repeated recrystallization melt at 168–170° C.

3.75 grams of the above oxime are heated with 50 ml. of 90% acetic acid for 1 hour at 80° C. under nitrogen, then evaporated under vacuum, dissolved in a 4:1-mixture of methylenechloride+ether, washed with saturated sodium bicarbonate solution and water, dried and once more evaporated under vacuum. Crystallization of the residue from a mixture of methylenechloride+ether furnishes 2.32 g. of 4-oximino-17-oxo-A-homo-$\Delta^{1(10),2,4a}$-19-norandrostatriene. After recrystallization the deep-red crystals melt at 193–195° C.

EXAMPLE 2

A mixture of 1 g. of 3-oxo-17$\alpha$-methyl-17$\beta$-hydroxy-19-chloro-$\Delta^{1,4}$-androstadiene, 1 g. of hydroxylamine hydrochloride and 100 ml. of pyridine is kept for 5 days at room temperature, then poured into water, extracted with toluene, washed with water, dried and evaporated under vacuum. The resulting crude 3-oximino-17$\alpha$-methyl-17$\beta$-hydroxy-19-chloro-$\Delta^{1,4}$-androstadiene is dissolved in 62 ml. of 4% methanolic sodium hydroxide solution and refluxed for 6 hours under nitrogen, then poured into 200 ml. of water and 8.2 ml. of glacial acetic acid, extracted with a 1:4-mixture of methylenechloride+ether, washed with semisaturated sodium bicarbonate solution, dried and evaporated under vacuum. The resulting crude 4-oximino-17$\alpha$-methyl-17$\beta$-hydroxy-A-homo - $\Delta^{1(10),2,4a}$ - 19 - norandrostatriene purified by preparative thin-layer chromatography on silicagel (10 plates of 1 m. each) in the system toluene+acetone 4:1. It forms a yellow-brown zone from which it is isolated in the usual manner. The oxime crystallizes from ether in the form of deep-red crystals containing 1 mol of ether; they begin to melt already at 50 to 60° C. and have completed their melting at about 150° C.

EXAMPLE 3

5 ml. of 3-molar solution of methyl magnesium chloride in tetrahydrofuran is stirred under nitrogen into a solution of 1.2 g. of the 4-oximino-17-oxo-A-homo-$\Delta^{1(10),2,4a}$-19-nor-androstatriene in 40 ml. of absolute tetrahydrofuran. One hour later the batch is poured into 200 ml. of saturated ammonium chloride solution and extracted with toluene. The organic solutions are washed with saturated ammonium chloride solution, dried and evaporated under vacuum; the resulting residue still displays in the infrared spectrum a relatively strong 5-ring ketone band. The reaction with methyl magnesium chloride carried out as described above is therefore repeated twice more. According to its infrared spectrum the resulting crude product is practically free from starting material. The 4-oximino - 17$\alpha$ - methyl-17$\beta$-hydroxy-A-homo-$\Delta^{1(10),2,4a}$-19-nor-androstatriene is isolated by preparative thin-layer chromatography on silicagel (10 plates, 1 m. each) in the system toluene+acetone 4:1, the yellow-brown zone is scratched out and eluted with a 4:1-mixture of toluene+methanol. The pure oxime obtained in this manner is identical with the product of Example 2.

EXAMPLE 4

500 mg. of 3-oxo - 17 - ethylenedioxy-19-mesyloxy-$\Delta^{1,4}$-androstadiene is stirred with a mixture of 50 ml. of pyridine and 500 mg. of semicarbazide hydrochloride for 28 hours at room temperature, then poured into water and extracted with toluene. The organic solutions are washed with water, dried and evaporated under vacuum. Crystallization of the residue from methylenechloride and a small quantity of ether furnishes 510 mg. of the semicarbazone of 3-oxo-17-ethylenedioxy-19-mesyloxy-$\Delta^{1,4}$-androstadiene in the form of colourless crystals which gradually change colour when heated, but at 250° C. they have still not melted.

400 mg. of the semicarbazone and 25 ml. of 4% methanolic sodium hydroxide solution are stirred for 28 hours, then poured into 100 ml. of water and 3.3 ml. of glacial acetic acid and extracted with a 1:4-mixture of methylenechloride+ether. The organic solutions are washed with dilute sodium bicarbonate solution, dried and evaporated under vacuum, and the residue is chromatographed on three thin-layer plates of 1 m. each with silicagel in the system toluene+methanol 9:1. The brown zone is scratched out and eluted with a 9:1-mixture of toluene+methanol. The eluate is washed with water, dried and evaporated and the residue recrystallized from a mixture of methylenechloride+ether, to furnish 73 mg. of the semicarbazone of 4-oxo - 17 - ethylenedioxy-A-homo-$\Delta^{1(10),2,4a}$-19-nor-androstatriene in the form of light-brown crystals which slowly decompose above about 183° C.

EXAMPLE 5

Acetylene is introduced for 30 minutes into 80 ml. of absolute tetrahydrofuran while stirring. The introduction of acetylene is continued while, in the course of 15 minutes, 100 ml. of an 0.31-molar solution of methylmagnesium chloride in tetrahydrofuran is added dropwise. After 30 minutes the introduction of acetylene is stopped and nitrogen is introduced. To the solution of ethinylmagnesium chloride is added 1 g. of 4-oximino-17-oxo-A-homo-$\Delta^{1(10),2,4a}$-19-nor-androstatriene and the vessel rinsed with 4 ml. of tetrahydrofuran and stirring is continued for 2 hours at room temperature. The batch is then cooled while a saturated ammonium chloride solution is added, and the whole extracted several times with toluene. The organic solutions are washed with saturated ammonium chloride solution, dried and evaporated under reduced pressure and the residue separated on 10 plates of silica gel each 1 m. long using the system toluene+ acetone (4:1), whereupon the yellow-brown main zone is scratched out and eluated with a 4:1 mixture of toluene and methanol. The eluate is washed with dilute sodium chloride solution and extracted further with toluene, and the organic solutions then dried and evaporated under reduced pressure. Crystallization of the residue from methylene chloride gives 226 mg. of 4-oximino-17α-ethinyl - 17β - hydroxy-A-homo-$\Delta^{1(10),2,4a}$-19-nor-androsatriene melting at 205.5–207.5° C. From the concentrated mother liquor another 78 mg. of the same compound can be obtained.

EXAMPLE 6

800 mg. of 3-oxo-17α-hydroxy-19-mesyloxy-20-ethylenedioxy-$\Delta^{1,4}$-pregnadiene, 800 mg. of hydroxylamine hydrochloride and 80 ml. of pyridine are stirred until dissolution is complete. After 24 hours the solution is poured into water and the whole extracted several times with toluene. The organic solutions are washed with water, dried and evaporated in vacuo. The crude 3-oximino-17α-hydroxy-19-mesyloxy - 20-ethylenedioxy-$\Delta^{1,4}$-pregnadiene so obtained is treated with 50 ml. of 8% methanolic sodium hydroxide solution, and the whole refluxed for 2 hours in a current of nitrogen. The batch is then poured into 200 ml. of water and 6.6 ml. of glacial acetic acid, extracted with a 4:1-mixture of methylene chloride and ether, dried and evaporated. Crystallization of the residue from a mixture of methylene chloride and ether gives 3 - oximino-17α-hydroxy-20-ethylenedioxy - A - homo-$\Delta^{1(10),2,4a}$-19-nor-pregnadiene in the form of yellow-brown crystals. When recrystallized from tetrahydrofuran the substance melts at 238 to 238.5° C. (with decomposition).

100 mg. of the resulting oxime and 5 ml. of 90% acetic acid are heated at 80° C. for 1 hour in a current of nitrogen. The reaction mass is then evaporated in vacuo, the residue dissolved in a 1:4-mixture of methylene chloride and ether, washed with sodium bicarbonate solution and water, dried, and evaporated in vacuo. The resulting crude 4 - oximino - 17α - hydroxy - 20-oxo-A-homo-$\Delta^{1(10),2,4a}$-19-nor-pregnadiene crystallizes when ether is added.

EXAMPLE 7

A mixture of 10 mg. of 3-oxo-19-mesyloxy-$\Delta^{1,4}$-cholestadiene, 12 mg. of hydroxylamine hydrochloride and 1 ml. of pyridine is stirred until dissolution is complete and the solution then allowed to stand at room temperature for 24 hours. After that, is is poured into water, extracted with toluene, washed with water, dried and evaporated under reduced pressure.

The crude 3-oximino-19-mesyloxy-$\Delta^{1,4}$-cholestadiene so obtained and 5 ml. of 8% methanolic sodium hydroxide solution are boiled for 2 hours in a current of nitrogen. The reaction mixture is then poured into 20 ml. of water and 0.66 ml. of glacial acetic acid and the whole extracted several times with a 1:4-mixture of methylene chloride and ether. The organic solutions are washed with dilute sodium bicarbonate solution and water, dried and evaporated. The resulting residue is subjected to preparative thin-layer chromatography on silica gel using a plate of 20 cm. in the system chloroform+acetone (95:5). From the yellow-brown zone there is obtained by extraction with a 4:1 toluene+ethyl acetate mixture, 4-oximino-A-homo-$\Delta^{1(10),2,4a}$-19-nor-cholestatriene.

What is claimed is:

1. Process for the manufacture of 4-imino-19-nor-A-homo-steroid-trienes whose double bonds are located in the ring A, wherein a 3-imino-$\Delta^{1,4}$-steroid-diene of the androstane, pregnane or cholestane series that contains a hydroxymethyl group in position 10 which is esterified with a hydrohalic acid or a sulfonic acid is reacted with a strong base.

2. Process according to claim 1, wherein the strong base used is an inorganic base.

3. Process according to claim 1, wherein the strong base used is an organic base.

4. Process according to claim 1, wherein the starting material is a 3-imino-$\Delta^{1,4}$-steroid-diene of the formula

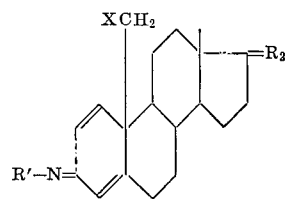

in which R′ represents a free or esterified hydroxy group of a secondary or teritary amino group, X stands for a hydroxy group esterified with a hydrohalic acid or a sulfonic acid, and $R_2$ for a free oxo or ethylenedioxy group or a β-positioned free, esterified or etherified hydroxyl group together with a hydrogen atom or a lower aliphatic, saturated or unsaturated hydrocarbon.

5. Process according to claim 4, wherein the starting material is 3-oximino-17-ethylenedioxy-$\Delta^{1,4}$-androstadiene.

6. Process according to claim 4, wherein the starting material is 3 - oximino-17α-methyl-17β-hydroxy-$\Delta^{1,4}$-androstadiene.

7. Process according to claim 4, wherein the starting material is the semicarbazone of 3-oxo-17-ethylenedioxy-$\Delta^{1,4}$-androstadiene.

8. Process according to claim 1, wherein the starting material is a 3-imino-$\Delta^{1,4}$-steroid-diene of the formula

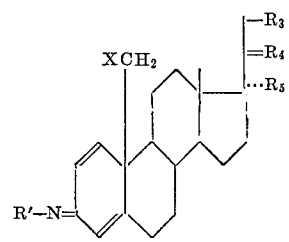

in which R′ represents a free or esterified hydroxy group or a secondary or tertiary amino group, X stands for a hydroxyl group esterified with a hydrohalic acid or a sulfonic acid, $R_3$ for hydrogen or a free, esterified or etherified hydroxyl group, $R_4$ for a free oxo or an ethylenedioxy group, and $R_5$ for hydrogen or a free or esterified hydroxyl group or $R_3$, $R_4$ and $R_5$ together represent a bismethylenedioxy group.

9. Process according to claim 8, wherein the starting material is a 3-oximino-17α-hydroxy-20-ethylenedioxy-$\Delta^{1,4}$-pregnadiene.

10. Process according to claim 1, wherein the material is a 3-oximino-$\Delta^{1,4}$-cholestadiene.

11. Process according to claim 1, wherein the starting material is formed under the reaction conditions.

References Cited

UNITED STATES PATENTS 3,059,019 10/1962 Ringold _____ 260—586 X
3,444,188 5/1969 Knox _____ 260—488

ALEX MAZEL, Primary Examiner

J. H. TURNIPSEED, Assistant Examiner

U.S. Cl. X.R.

260—294.3, 326.85, 345.7, 347.4, 347.5, 410, 463, 473, 487, 488, 566, 570.5, 586

PO-1050
(5/69)

UNITED STATES PATENT OFFICE
CERTIFICATE OF CORRECTION

Patent No. 3,646,064            Dated February 29, 1972

Inventor(s) GEORG ANNER ET AL

It is certified that error appears in the above-identified patent and that said Letters Patent are hereby corrected as shown below:

Column 1, line 6, after "assignors to" delete "Ciba Corporation" and insert -- CIBA-GEIGY CORPORATION --.

Column 6, line 59, after "wherein the" insert -- starting --.

Signed and sealed this 2nd day of April 1974.

(SEAL)
Attest:

EDWARD M. FLETCHER, JR.          C. MARSHALL DANN
Attesting Officer                Commissioner of Patents df